(12) United States Patent
Ulcar et al.

(10) Patent No.: US 9,187,674 B2
(45) Date of Patent: Nov. 17, 2015

(54) FIRE RESISTANT COATING

(75) Inventors: John Ulcar, Mississauga (CA); Tony Csaba, Brampton (CA)

(73) Assignee: Crosslink Technology Inc., Ontario (CA)

( * ) Notice: Subject to any disclaimer, the term of this patent is extended or adjusted under 35 U.S.C. 154(b) by 1073 days.

(21) Appl. No.: 13/083,734

(22) Filed: Apr. 11, 2011

(65) Prior Publication Data

US 2012/0256143 A1  Oct. 11, 2012

(51) Int. Cl.
| | |
|---|---|
| C09K 21/00 | (2006.01) |
| C09K 21/10 | (2006.01) |
| C09D 5/18 | (2006.01) |
| C09D 175/04 | (2006.01) |
| C08K 3/04 | (2006.01) |
| C08K 3/36 | (2006.01) |
| C08K 7/22 | (2006.01) |

(52) U.S. Cl.
CPC ............... C09D 175/04 (2013.01); C09D 5/18 (2013.01); C08K 3/04 (2013.01); C08K 3/36 (2013.01); C08K 7/22 (2013.01)

(58) Field of Classification Search
CPC .......... C09D 5/18; C09D 175/04; C08K 3/04; C09K 21/00; C09K 21/10
USPC .............................. 106/18.11, 18.14; 252/601
See application file for complete search history.

(56) References Cited

U.S. PATENT DOCUMENTS

| | | | |
|---|---|---|---|
| 6,765,035 B2 * | 7/2004 | Eling et al. ..................... 521/174 |
| 6,884,825 B2 * | 4/2005 | Daunch et al. ................. 521/174 |
| 7,601,762 B2 * | 10/2009 | Clatty et al. .................. 521/137 |
| 2003/0049458 A1 * | 3/2003 | Rickner et al. ............. 428/423.1 |

* cited by examiner

*Primary Examiner* — Anthony J Green
(74) *Attorney, Agent, or Firm* — Lowenstein Sandler LLP

(57) ABSTRACT

A fire-resistant coating composition and method that can be applied to various poles and substrates so as to substantially reduce the likelihood of fire and/or heat damage. The first-resistant coating composition having a first component and a second component. The first component may comprise isocyanate and a thickening agent, and the second component may comprise a multifunctional polyol, preferably a tetrafunctional polyol, most preferably an amine-based tetrafunctional polyol, titanium dioxide, diol ether, expandable graphite particles, a flame retardant additive, at least one thickening agent, and a catalyst.

18 Claims, No Drawings

FIRE RESISTANT COATING

FIELD OF THE INVENTION

This invention relates to coatings. In particular, this invention relates to fire resistant coatings for telephone poles, hydro poles and the like.

BACKGROUND OF THE INVENTION

It is well-known that telephone poles, hydro poles and the like can often be subjected to extreme temperatures and brush fires and thus susceptible to fire. Such fires can be very dangerous and cause extensive damage. There is therefore a need to prevent fires from starting on or spreading to such structures. Products that prevent flame spread and thermal damage and thereby protect poles and other surfaces against fire can be used for such purposes.

Currently available fire-resistant coatings have the following drawbacks: they do not adhere well to wet substrates; they require a significant amount of time after application to achieve function; they are not intumescing; and they function poorly on any chemical treated (such as a penta or a wood preservative treated) pole or fence.

It would accordingly be advantageous to provide a product and a method of easily applying such a product to various flammable substrates to make them fire resistant.

DETAILED DESCRIPTION OF THE INVENTION

The present invention relates to a fire resistant, intumescent coating that can be applied to a variety of substrates in order to protect the substrate from excessive heat and/or fire, and a method of protecting a substrate from excessive heat and/or fire.

In the preferred embodiment, the invention comprises a fire resistant coating composition having a first and second component. The first component may comprise isocyanate and preferably, a thickening agent, and the second component may comprise a multifunctional polyol, preferably a tetrafunctional polyol, most preferably an amine-based tetrafunctional polyol, at least one pigment, diol ether, expandable graphite particles, a flame retardant additive, and a catalyst. The second component may also preferably include a thickening agent. The preferred components are described herein by way of example for the preferred embodiment; however the invention is not intended to be limited to the specific components so described.

The isocyanate functions as a hardener. Suitable isocyanates for the purposes of the first component of this invention include aliphatic isocyanates and cycloaliphatic isocyanates such as hexamethylene diisocyanate (HDI), hydrogenated methylene diisocyanate (HMDI), and isophorone diisocyanate (IPDI). Aromatic isoyanates may also be used for this purpose, however they may not be preferred for some applications due to their poor outdoor performance.

A suitable thickening agent as may be used in the first and second components of the coating composition of this invention includes fumed silica (silicon dioxide) and bentone clay. The thickening agent functions to trap liquid and thereby modify the viscosity of the first component. A thickening agent is not necessary but is preferred for rheological purposes. In particular, the thickening agent functions to suspend the particles in the unmixed material, as well as reduce flow after mixing and application.

If a thickening agent is used, the first component of the coating composition preferably comprises from about 90 to about 99% by weight of isocyanate and from about 1 to 10% by weight of the thickening agent.

Suitable amine-based tetrafunctional polyols for the purposes of this invention include, without limitation: ethylene diamine based polyols, and ethoxylated and propoxylated ethylenediamine with various molecular weights. Non-amine based multifunctional polyols may also be used with various degrees of effectiveness.

The pigment is used for its high-refractive index and ability to absorb strong ultraviolet (UV) light. Suitable pigments for the purposes of this invention include, without limitation: titanium dioxide pigment, and hindered amine light stabilizers (such as ZnO and benzotriazoles).

Expandable graphite has properties that decrease thermal conductivity and provide flame retardation. In particular, the expandable graphite particles undergo expansion upon exposure to heat and/or flame. The volume of the particles can increase to greater than 80 times their original volume in just a few seconds.

Suitable flame retardant additives for the purposes of this invention include aryl phosphates and phenyl phosphates. Possible phenyl phosphates include but are not limited to 2-ethylhexyl diphenyl phosphate, Na salts, $NH_4$ salts, Mg salts, dicyclohexylammonium salt, Di(Tris) salt, and di(2-amino-2-ethyl(1,3-propanediol)) salt, melamine pyrophosphate (MPP), ammonium polyphosphate (APP), as well as isomers thereof.

A catalyst preferably should be used to facilitate reaction at a reasonable rate between the isocyanate and the polyol. Examples of appropriate catalysts include polyurethane catalysts and tin catalysts.

Examples of suitable polyurethane catalysts include, without limitation, oleic acid, and weak acid catalysts. Examples of suitable tin catalysts for the purposes of this invention include, without limitation, dibutyl tin dilaurate, stannous octoate, mercapto tin catalysts.

Trimerization catalysts, such as DABCO TMR, may also be used as a catalyst in the present invention. Trimerizing isocyanate groups function to provide flame out properties.

Mercury catalysts may also be used, however there are many safety concerns with the use of mercury and thus its use is cautioned.

The second component preferably comprises from about 30 to about 60% by weight of an amine-based tetrafunctional polyol, from about 1 to about 10% by weight of a pigment, such as titanium dioxide, from about 5 to about 20% by weight of diol ether, from about 20 to about 50% by weight expandable graphite particles, from about 8 to about 30% by weight of flame retardant additive, from about 2 to about 4% by weight of thickening agent, from about 0.1% to about 5% by weight of a tin catalyst, and from about 0.1 to about 2% by weight of the polyurea catalyst.

The composition and method of the invention will intumesce upon application of heat to form a fire barrier for the substrate. There are many advantages of the coating composition of the present invention. The composition is formulated to withstand outdoor conditions such as regular weathering exposure due to sunlight, and hot and cold temperature cycles, all of which normally break down plastics. The composition can be applied to poles that have been treated with creosote and other protective chemicals. The composition may be colour coded for easy identification of poles that are already coated with the composition. Further, the composition is gaffable and thus allows workers to climb poles to which the composition has been applied with their spurs without slipping.

EXAMPLE 1

A coating composition, the first composition having the formulation: 97.0% cycloaliphatic isocyanate and 3.0% fumed silica (for viscosity control/thickening purposes). The second composition having the formulation: 39.7% 360-amine based tetrafunctional polyol, 3.2% titanium dioxide pigment, 7.9% diol ether, 27.5% expandable graphite particles, 15.9% 2-ethylhexyl diphenyl phosphate (a flame retardant additive); 3.2% bentone clay (for viscosity control), 1.6% fumed silica (for viscosity control), 0.4% mercaptan-tin catalyst, and 1.6% oleic acid (polyurea catalyst).

EXAMPLE 2

A coating composition, the first composition having the formulation: 98.4% cycloaliphatic isocyanate (preferably HDI (Hexamethylene Diisocyanate) but could also use HMDI (Hyhdrogenated Methylene Diisocyanate) or IPDI (Isophorone Diisocyanate), and whereby these products could also be modified by making them into prepolymers); and 1.6% fumed silica (for viscosity control).

The second composition having the formulation: 39.2% 360 molecular amine based tetrafunctional polyol or ethylene diamine based polyols, 3.1% titanium dioxide pigment, 7.8% diol ether, 27.5% expandable graphite particles, 15.7% 2-ethylhexyl diphenyl phosphate (a flame retardant additive); 3.1% bentone clay (for viscosity control), 1.6% fumed silica (for viscosity control), 0.4% mercaptan-tin catalyst, and 1.6% oleic acid (polyurea catalyst).

To apply the coating composition, the first and second components of the composition of the present invention are each placed in a separate cartridge and a conventional air-driven dispensing gun may be used to apply the composition. The gun preferably sprays the first component and the second component at the same time such that the components mix before, or while travelling to the substrate. If a conventional air-driven dispensing gun is used, it may have a static mixhead that is attached to the two cartridges. It will be appreciated by those skilled in the art that while each component is pre-mixed for convenience and ease of use, it is also possible to break each component down into separate sub-components containing one or more of the constituent elements that are then mixed in the process of applying the components to the substrate.

The coating composition may be applied to any substrate that is susceptible to fire and/or extremely high temperatures. Such substrates include telephone poles, hydro poles, advertising poles, fence posts, and the like.

Various embodiments of the present invention having been thus described in detail by way of example, it will be apparent to those skilled in the art that variations and modifications may be made without departing from the invention.

What is claimed is:

1. A fire-resistant coating composition comprising:
a first component comprising an isocyanate,
at least a second component comprising an amine-based tetrafunctional polyol, at least one pigment, diol ether, expandable graphite particles, a flame retardant additive, a thickening agent and at least one catalyst,
wherein the amine-based tetrafunctional polyol comprises from about 30 to about 60% by weight of the total second component, the pigment comprises from about 1 to about 10% by weight of the total second component, the diol ether comprises from about 5 to about 20% by weight of the total second component, the expandable graphite particles comprise from about 20 to about 50% by weight of the total second component, the flame retardant additive comprises from about 8 to about 30% by weight of the total second component, the thickening agent comprise from about 2 to about 5% by weight of the total second component, the at least one catalyst comprises a tin catalyst comprising from about 0.1% to about 4% by weight of the total second component and a polyurethane catalyst comprising from about 0.1 to about 2% by weight of the total second component.

2. The coating composition of claim 1 wherein the first component further comprises a thickening agent.

3. The coating composition of claim 2 wherein the isocyanate comprises from about 90 to about 99% by weight of the combined amount of the first component and the thickening agent comprises about 1 to 10% by weight of the combined amount of the first component.

4. The coating composition of claim 1 wherein the tin catalyst is selected from the group consisting of mercaptan-tin catalyst, dibutyl tin dilaurate and stannous octoate.

5. The coating composition of claim 1 wherein the polyurethane catalyst is selected from the group consisting of oleic acid and weak acid catalysts.

6. The coating composition of claim 1 wherein the pigment is at least one of titanium dioxide and hindered amine light stabilizers.

7. The coating composition of claim 1 wherein the isocyanate is an aliphatic isocyanate or a cycloaliphatic isocyanate.

8. The coating composition of claim 7 wherein the cycloaliphatic isocyanate is selected from the group consisting of hexamethylene diisocyanate, hydrogenated methylene diisocyanate and isophorone diisocyanate.

9. The coating composition of claim 2 wherein the thickening agent of the first component and second component is at least one of fumed silica and bentone clay.

10. The coating composition of claim 1 wherein the flame retardant additive is aryl phosphate.

11. The coating composition of claim 1 wherein the flame retardant additive is phenyl phosphate.

12. The coating composition of claim 11 wherein the phenyl phosphate is selected from the group consisting of 2-ethylhexyl diphenyl phosphate, sodium phenyl phosphate, disodium phenyl phosphate, ammonium phenyl phosphate, Magnesium phenyl phosphate, phenyl phosphate dicyclohexylammonium salt, phenyl phosphate Di(Tris) salt, phenyl phosphate di(2-amino-2-ethyl(1,3-propanediol)) salt, and isomers thereof.

13. The coating composition of claim 1, wherein the flame retardant additive is selected from the group consisting of melamine pyrophosphate (MPP), ammonium polyphosphate (APP), and isomers thereof.

14. A substrate that is coated with a coating composition comprising:
a first component comprising an isocyanate,
at least a second component comprising an amine-based tetrafunctional polyol, at least one pigment, diol ether, expandable graphite particles, a flame retardant additive, and a catalyst,
wherein the substrate is selected from the group consisting of a telephone pole, a hydro pole, an advertising pole, and a post.

15. A method for applying a fire resistant coating to a substrate comprising:
   providing a first component comprising an isocyanate,
   providing at least a second component comprising an amine-based tetrafunctional polyol, at least one pigment, diol ether, expandable graphite particles, a flame retardant additive, and a catalyst,
   mixing the first component with the second component to produce a coating composition, and
   applying the coating composition to the substrate,
   wherein the substrate comprises one of a telephone pole, a hydro pole, an advertising pole, and a post.

16. The method of claim 15, wherein the first component and the second component are each provided in a separate cartridge suitable for use in an air-driven dispensing gun, and wherein the first component and the second component are mixed, and the coating composition is applied to the substrate, by spraying the first component and the second component from the gun at the same time, to deposit the mixed fire resistant composition onto the substrate.

17. A kit comprising at least a first component and a separate second component:
   the first component comprising an isocyanate,
   the second component comprising an amine-based tetrafunctional polyol, at least one pigment, diol ether, expandable graphite particles, a flame retardant additive, and a catalyst,
   wherein the first component and the second component may be mixed to produce a fire resistant composition for coating and protecting a substrate from excessive heat or fire, wherein the substrate is selected from the group consisting of a telephone pole, a hydro pole, an advertising pole, and a post.

18. The kit according to claim 17, wherein the first component and the second component are each provided in a separate cartridge suitable for use in an air-driven dispensing gun, and wherein the first component and the second component may be mixed by spraying the first component and the second component at the same time, such that the mixed fire resistant composition may be deposited onto the substrate.

* * * * *